(12) United States Patent
Graham

(10) Patent No.: US 9,273,806 B2
(45) Date of Patent: Mar. 1, 2016

(54) FLEXIBLE PIPE HAVING PRESSURE ARMOUR LAYER AND COMPONENTS THEREOF

(75) Inventor: Geoffrey Stephen Graham, Tyne & Wear (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 985 days.

(21) Appl. No.: 13/128,845

(22) PCT Filed: Oct. 30, 2009

(86) PCT No.: PCT/GB2009/051467
§ 371 (c)(1),
(2), (4) Date: Jun. 24, 2011

(87) PCT Pub. No.: WO2010/055323
PCT Pub. Date: May 20, 2010

(65) Prior Publication Data
US 2011/0247695 A1    Oct. 13, 2011

(30) Foreign Application Priority Data

Nov. 12, 2008 (GB) .................................. 0820668.2

(51) Int. Cl.
*F16L 11/16* (2006.01)
*F16L 11/08* (2006.01)
*E21B 17/01* (2006.01)

(52) U.S. Cl.
CPC ............... *F16L 11/082* (2013.01); *E21B 17/01* (2013.01); *F16L 11/16* (2013.01);
(Continued)

(58) Field of Classification Search
CPC ....... F16L 11/082; F16L 11/16; F16L 11/083; E21B 17/01; Y10T 137/0318; Y10T 428/24521
USPC ........... 138/129–131, 133–135, 137; 156/188
See application file for complete search history.

(56) References Cited

U.S. PATENT DOCUMENTS

| 4,800,928 A | * | 1/1989 | Kanao ............................ 138/122 |
| 5,275,209 A | | 1/1994 | Sugier et al. |

(Continued)

FOREIGN PATENT DOCUMENTS

| FR | 2561745 A1 | 9/1985 |
| FR | 2650652 A1 | 2/1991 |
| FR | 2824890 A1 | 11/2002 |

OTHER PUBLICATIONS

International Search Report and Written Opinion of the International Searching Authority, mailed Mar. 23, 2010, for corresponding International Application No. PCT/GB2009/051467, 20 pages.

(Continued)

*Primary Examiner* — Kevin P Shaver
*Assistant Examiner* — Robert Nichols, II
(74) *Attorney, Agent, or Firm* — Klarquist Sparkman, LLP

(57) ABSTRACT

An elongate metallic or polymeric or composite tape is disclosed along with a method of manufacturing such tape. The tape is of a type suitable for forming at least one helically wound layer of interlocked windings in a flexible pipe body for transporting production fluids. The tape is configured for interlocking of adjacent windings in the layer of tape by nesting a hooked region of a winding in a valley region of an adjacent winding. The tape comprises first and second elongate tape elements arranged in contacting relation.

39 Claims, 6 Drawing Sheets

(52) U.S. Cl.
CPC ... *Y10T 137/0318* (2015.04); *Y10T 428/12389* (2015.01); *Y10T 428/24479* (2015.01); *Y10T 428/24521* (2015.01); *Y10T 428/24612* (2015.01)

(56) References Cited

U.S. PATENT DOCUMENTS

| | | | |
|---|---|---|---|
| 6,516,833 B1 | 2/2003 | Witz et al. | |
| 7,302,973 B2 * | 12/2007 | Glejbol et al. | 138/135 |
| 7,971,610 B2 * | 7/2011 | Booth et al. | 138/131 |
| 8,459,306 B2 * | 6/2013 | Clements et al. | 138/135 |
| 2004/0154677 A1 * | 8/2004 | Coutarel et al. | 138/135 |
| 2009/0000683 A1 * | 1/2009 | Sheldrake | 138/129 |
| 2009/0056824 A1 * | 3/2009 | Stikeleather | 138/131 |

OTHER PUBLICATIONS

International Preliminary Report on Patentability and Written Opinion of the International Searching Authority, mailed May 26, 2011, for corresponding International Application No. PCT/GB2009/051467, 12 pages.

* cited by examiner

FLEXIBLE PIPE HAVING PRESSURE ARMOUR LAYER AND COMPONENTS THEREOF

CROSS REFERENCE TO RELATED APPLICATIONS

This is the U.S. National Stage of International Application No. PCT/GB2009/051467, filed Oct. 30, 2009, which in turn claims the benefit of United Kingdom Application No. GB0820668.2, filed Nov. 12, 2008.

The present invention relates to flexible pipes which may be used to convey fluids such as production fluids. In particular, but not exclusively, the present invention relates to flexible pipe body and a method for manufacturing flexible pipe body having a layer formed by interlocking adjacent windings of a helically wound tape.

Traditionally flexible pipe is utilised to transport production fluids, such as oil and/or gas and/or water, from one location to another. Flexible pipe is particularly useful in connecting a sub-sea location to a further sub-sea location or a sea level location. Flexible pipe is generally formed as an assembly of a length of flexible pipe body and one or more end fittings. The pipe body is typically formed as a composite of tubular layers of material that form a fluid and pressure containing conduit. The pipe structure allows large deflections without causing bending stresses that impair the pipe's functionality over a desired lifetime. The pipe body is generally, but not necessarily, built up as a composite structure including metallic and polymer layers. Flexible pipe may be utilised as a flowline over land and/or at a sub-sea location. Flexible pipe may also be used as a jumper or riser.

In many prior known flexible pipes of this type a "pressure armour layer" is utilised to help reinforce an internal pressure sheath such as a fluid barrier or liner and prevent radial expansion and burst through due to differential pressure conditions acting across the pipe. The pressure armour layer is thus important for the pressure retainment capability of the flexible pipe. The pressure armour layer may also act as a principal reinforcement layer providing collapse resistance.

Typically the pressure armour layer which acts as a hoop strength layer is formed by helically winding one or more tapes about an underlying layer whereby adjacent tape windings interlock, with a claw or hook at one edge of a tape winding interlocking with a corresponding recess or valley region at an opposite edge in an adjacent winding.

Prior known pressure armour profiles are numerous and many have a Zeta or S-shape. One such example is illustrated in the European Patent Application having Publication Number EP 0929767. This discloses a flexible conduit formed with a helically wound band of metal to provide resistance to burst pressure. The band has a leading edge lip or hook and a trailing edge hook which engage and interlock when the band is helically wound. The cross section of the band has an asymmetrical Z-shape profile with a main body section intermediate the band end edges. However, it is noted that the handling of such winding through manufacturing may be difficult due to the asymmetry of the wire. Effectively the wire wishes to roll over on its side during manufacturing. Also the wire profile of the pressure armour layer constrains the wire's height to width ratio such that it is difficult to get a profile having a relatively large height. The constraint to the wire's height to width ratio limits the internal and/or external pressures which the pipe is able to withstand.

It is an aim of the present invention to at least partly mitigate the above-mentioned problems.

It is an aim of embodiments of the present invention to provide flexible pipe body including a pressure armour layer which is relatively simple to manufacture relative to prior known armour layers.

It is an aim of embodiments of the present invention to provide a pressure armour layer which can be included in flexible pipe body to improve burst resistance and collapse resistance and which is formed from one or more helically wound tapes having improved stability with respect to alternative prior known tape.

It is an aim of embodiments of the present invention to provide a pressure armour layer in which the cross section profile of tape wound in an interlocked fashion to provide the pressure armour layer, provides a layer thicker than layers formed via prior known techniques.

According to a first aspect of the present invention there is provided an elongate metallic or polymeric or composite tape for forming at least one helically wound layer of interlocked windings in a flexible pipe body for transporting production fluids, the tape being configured for interlocking of adjacent windings in the layer of tape by nesting of a hooked region of a winding in a valley region of an adjacent winding, wherein the tape comprises first and second elongate tape elements arranged in contacting relation.

According to a second aspect of the present invention there is provided an elongate metallic or polymeric or composite tape for forming at least one helically wound layer of interlocked windings in a flexible pipe body for transporting production fluids, wherein the tape comprises first and second elongate tape elements arranged in contacting relation, each tape element having
  a lip portion at a marginal edge thereof, the lip portion extending towards an imaginary lateral centre line of the tape, and
  a recessed portion adjacent comprising a recessed floor surface and opposed stop walls
  wherein, when in said helically wound layer, the lip portion of a first or second tape element is received in a recessed portion of a respective second or first tape element of an adjacent winding and may move along said recessed floor surface between said stop walls.

According to a third aspect of the present invention there is provided a method of manufacturing flexible pipe body, comprising the steps of:
  helically winding one or more tapes of the type as claimed in any one of claims 1 to 29 around a substantially tubular under-layer.

Embodiments of the present invention provide a pressure armour layer having enhanced features whereby the profile of tape used in a helical winding process may improve stability of the tape as it is applied to the pipe due to the tape profile aspect ratio. Also an increased overall thickness of the profile in comparison to prior known techniques may be achieved which allows the pressure armour layer to be thicker relative to a conventional layer thus enabling the pipe to resist higher burst pressures and increased hydrostatic external pressure than is otherwise possible with prior known pressure armour layers.

Embodiments of the present invention may include a recessed or inwardly turned upper surface in the cross section profile of the tape to avoid undesired contact with layers lying radially outside the pressure armour layer.

Embodiments of the present invention may incorporate a groove or grooves at an upper and/or lower region of the cross sectional profile of the tape in order to reduce weight per meter of tape and/or to receive inspection system such as optical fibres which may, for example, be utilised to assess stress in the tape. Also or alternatively heating/cooling systems for controlling the temperature of the pipe may be introduced into the groove or grooves as may permeated gas removal or introduction systems such as tubes of permeable material (or tubes having through holes bored therethrough) may be connected to the outside of the pipe through end fittings in order to drain a pipe annulus of gases or liquid or to introduce gases or liquids in order to control corrosion or remove corrosive chemicals from the annulus environment.

Embodiments of the present invention provide a tape which lies stably onto a pipe which improves handling of the tape through pipe manufacturing processes and allows an increase in an overall thickness of the tape layer without greatly increasing the overall width of the tape. Manufacture of the tape itself is also easier.

Embodiments of the present invention also include features able to reduce local stresses from forming in the tape and during wrapping of the tape around an inner layer. These features include, but are not limited to, increased corner radii at specific locations such as the internal radii in valley regions and mating external radii in nub regions. Also a region of the hook may be recessed or tapered inwardly to avoid pressure being applied to the windings from outer layers.

Embodiments of the present invention will now be described hereinafter, by way of example only, with reference to the accompanying drawings in which.

In the drawings like reference numerals refer to like parts.

Figure 1:
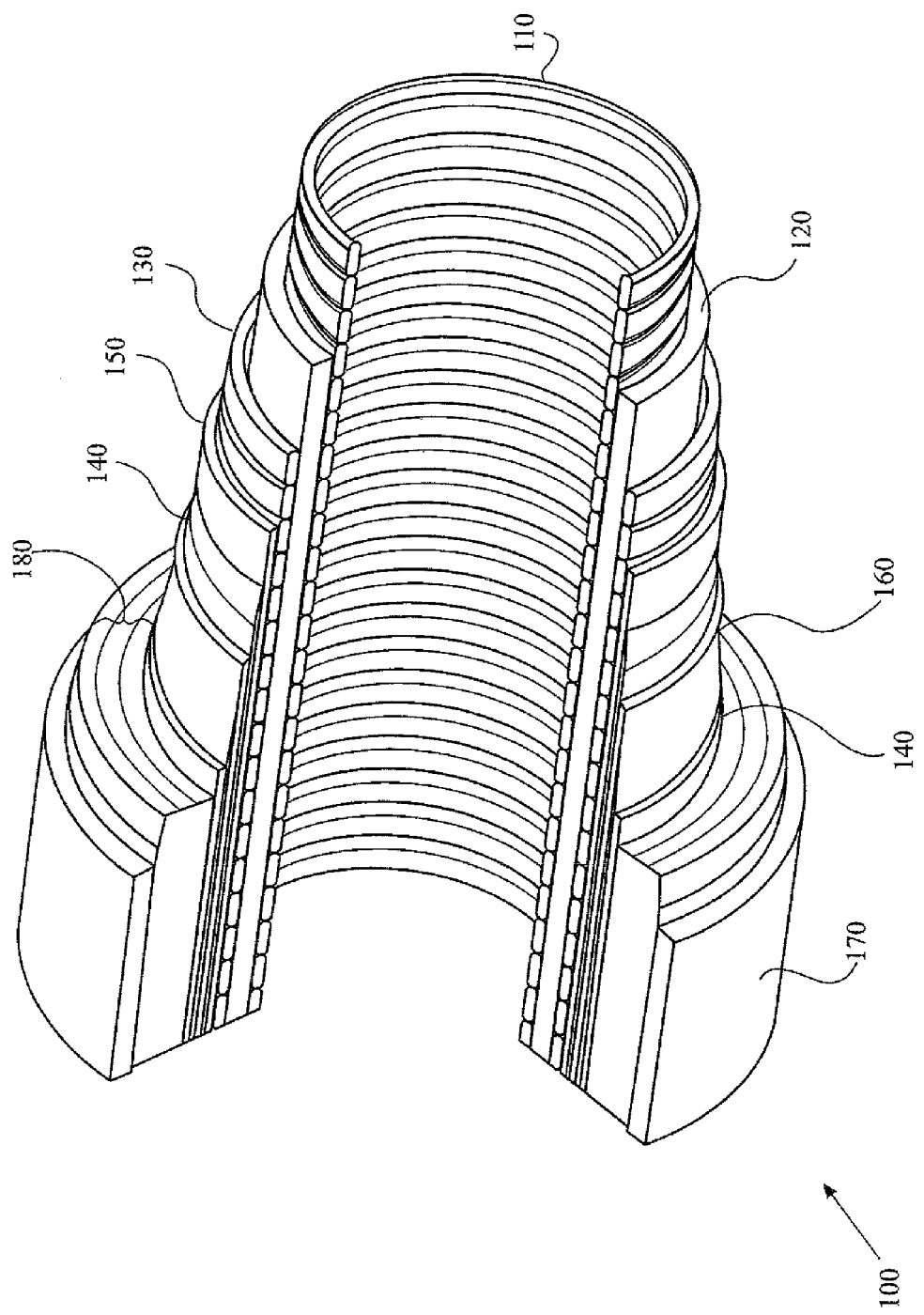
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an innermost carcass layer 110 and a pressure sheath 120. The carcass 110 provides an interlocked metallic construction that can be used as the innermost layer to prevent, totally or partially, collapse of an internal pressure sheath 120 due to pipe decompression, external pressure, tensile armour pressure and mechanical crushing loads. It will be appreciated that embodiments of the present invention are applicable to 'smooth bore' as well as such 'rough bore' applications.

The internal pressure sheath 120 acts as a fluid retaining layer and typically comprises a polymer layer that ensures internal-fluid integrity. It is to be understood that this layer 120 may itself comprise a number of sub-layers. It will be appreciated that when the optional carcass 110 layer is utilised the internal pressure sheath 120 is often referred to as a barrier layer. In operation without such a carcass 110 (so-called smooth-bore operation) the internal pressure sheath 120 may be referred to as a liner.

A pressure armour layer 130 is formed over the internal pressure sheath 120 and is a structural layer with a lay angle close to 90° that increases the resistance of the flexible pipe body 100 to internal and external pressure and mechanical crushing loads. The armour layer 130 also structurally supports the internal-pressure sheath 120 and typically consists of an interlocked metallic construction.

The flexible pipe body 100 may also include one or more layers of tape 140 and a first tensile armour layer 150 and second tensile armour layer 160. Each tensile armour layer 150, 160 is a structural layer with a lay angle typically between 20° and 55°. Each layer 150, 160 is used to sustain tensile loads and internal pressure. The tensile armour layers 150, 160 are counter-wound in pairs.

The flexible pipe body 100 also includes an outer sheath 170 which comprises a polymer layer used to protect the pipe body 100 against penetration of seawater and other external environments, corrosion, abrasion and mechanical damage. One or more layers 180 of insulation may also be included.

Each flexible pipe comprises at least one portion, sometimes referred to as a segment or section of pipe body 100 together with an end fitting located at at least one end of the flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
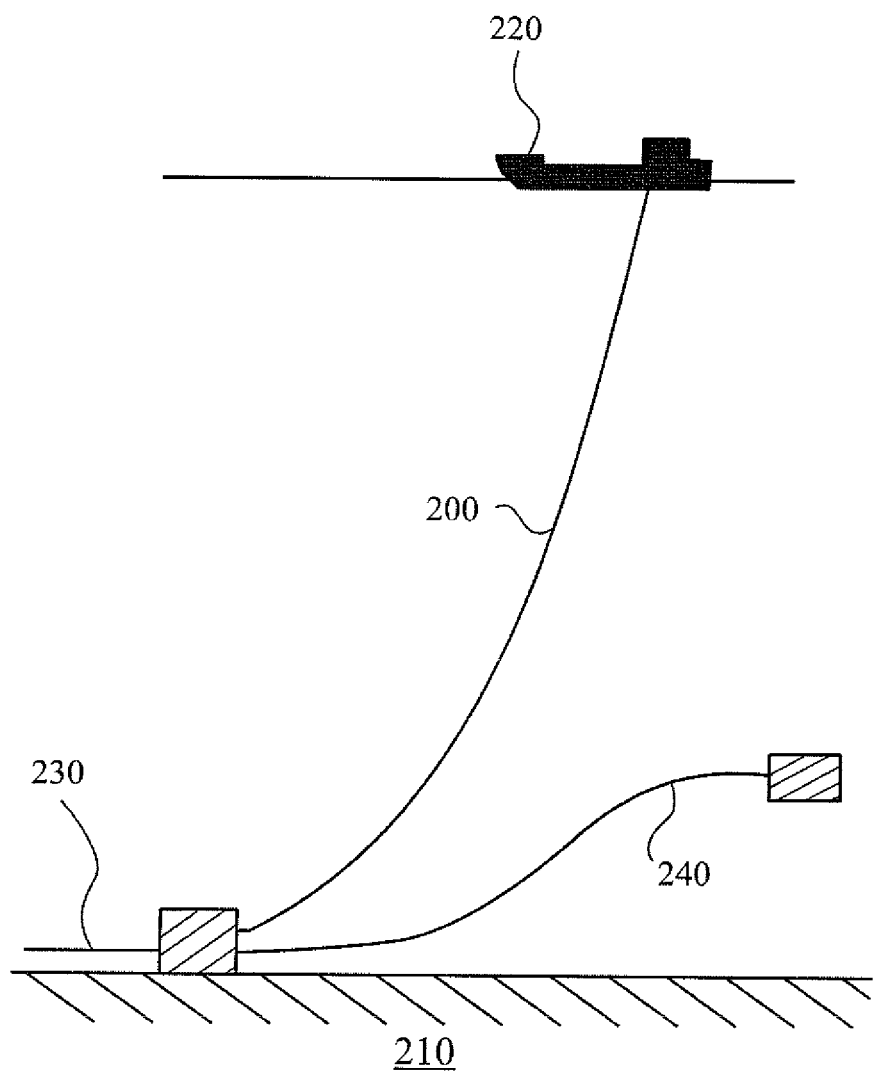
FIG. 2 illustrates a riser, flowline and jumper.

FIG. 2 illustrates a riser assembly 200 suitable for transporting production fluid such as oil and/or gas and/or water from a sub-sea location 210 to a floating facility 220. For example, in FIG. 2 the sub-sea location 210 is a connection to a sub-sea flow line 230. The flexible flow line comprises a flexible pipe, wholly or in part, resting on the sea floor or buried below the sea floor. The floating facility may be provided by a platform and/or buoy or, as illustrated in FIG. 2, a ship. The riser 200 is provided as a flexible riser, that is to say a flexible pipe connecting the ship to the sea floor installation. Alternatively the flexible pipe can be used as a jumper 240.

Figure 3:
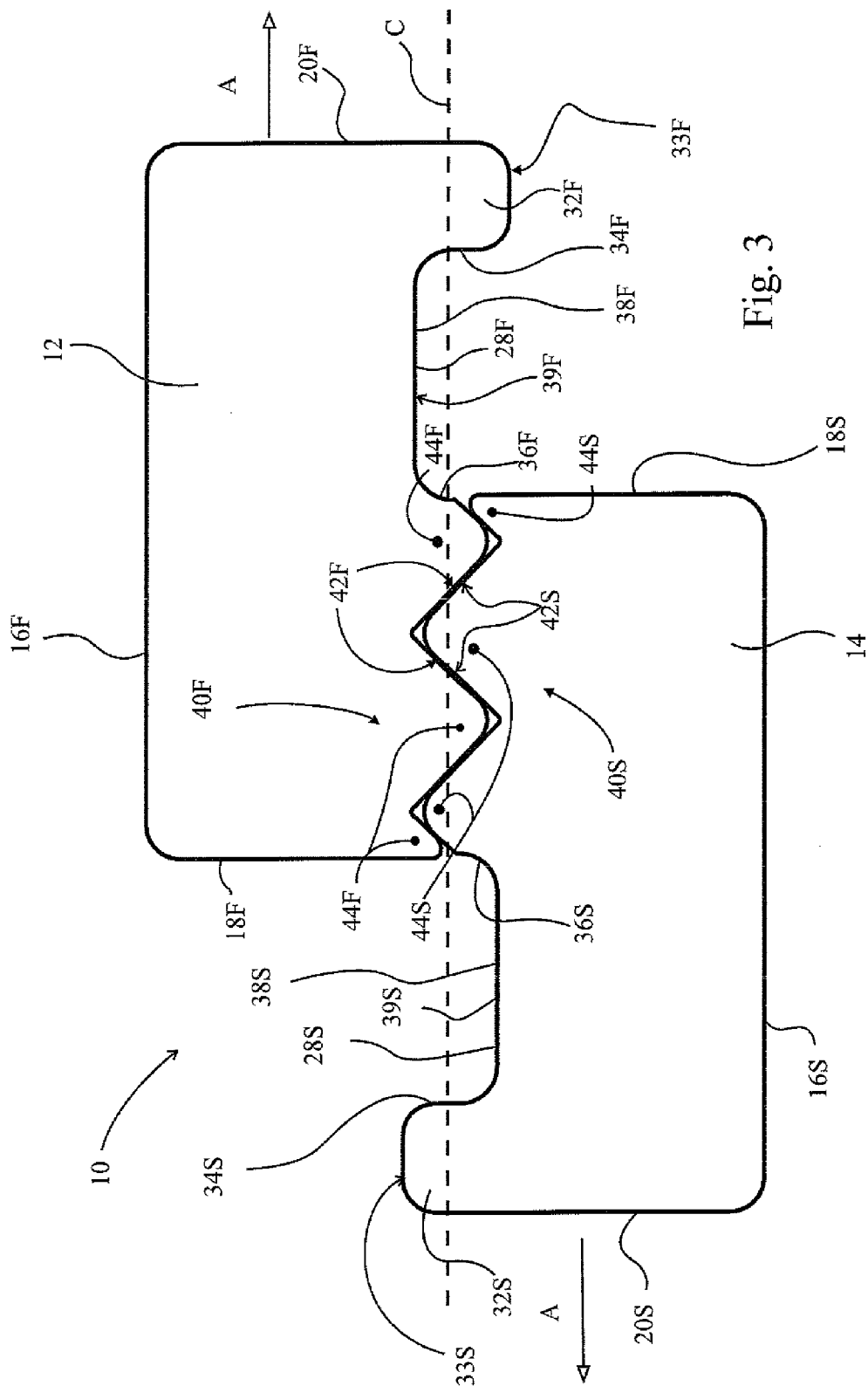
FIG. 3 illustrates the cross section/profile of a pressure armour tape according to a first embodiment.

FIG. 3 illustrates a cross section of a tape 10 according to a first embodiment of the present invention. It will be understood that throughout this specification reference is made to a tape and it will be understood that such a term is to be broadly construed as encompassing any elongate structure having a preformed cross section that can be wound in a helical fashion around an underlying structure.

Figure 4:
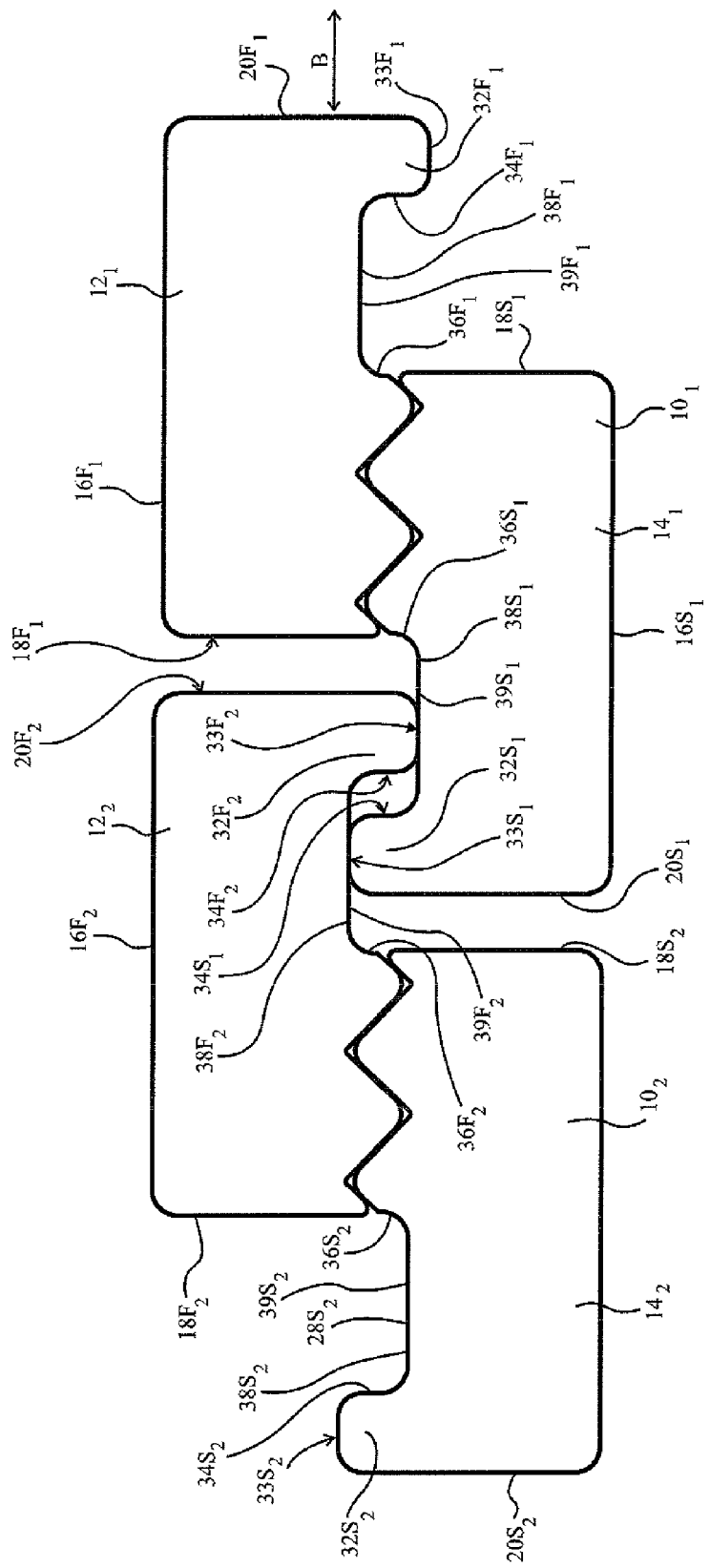
FIG. 4 illustrates a pressure armour layer of interlocked windings according to the first embodiment.

The tape 10 comprises a first tape element 12 and second tape element 14. First tape element 12 comprises a base wall 16F and side walls 18F, 20F extending from the base wall 16F. In the embodiment of FIGS. 3 and 4, side walls 18F, 20F extend substantially perpendicularly with respect to base wall 16F. Similarly, second tape element 14 comprises a base wall 16S and side walls 18S, 20S extending from the base wall 16S. In the embodiment of FIGS. 3 and 4, side walls 18S, 20S extend substantially perpendicularly with respect to base wall 16S. It will be appreciated that non perpendicular side walls could be utilised as will be described below.

First and second tape elements include respective contacting surfaces 28F, 28S. Contacting surface 28F of first tape element 12 extends from side wall 18F to side wall 20F and forms the external face of the tape element 12 opposite base wall 16F. Similarly contacting surface 28S of second tape element 14 extends from side wall 18S to side wall 20S and forms the external face of the second tape element 14 opposite base wall 16S.

First tape element 12 includes a lip portion 32F extending away from base wall 16F. Lip portion 32F is bounded on a first side by side wall 20F and on an opposed second side by a wall 34F. In preferred constructions, lip portion 32F extends across an imaginary lateral centre line C of the tape 10. In some preferred constructions, lip portion 32F may be provided with a distal (with respect to the base surface 16F) end surface 33F which is substantially planar. In other constructions, the distal end surface of lip portion 32F may be curved. A recessed portion 38F is provided adjacent lip portion 32F and is bounded by walls 34F and 36F. Recessed portion 38F includes a recessed floor surface 39F. In embodiments walls 34F and 36F may merge smoothly into floor surface 39F without any distinguishable boundary. For example, walls 34F and 36F and floor surface 39F may be parts of a continuous curved surface. Preferably, however, at least part (and in particular the major part and especially substantially all) of floor surface 39F is planar. A contacting region 40F extends between wall 36F of recessed portion 38F and side wall 18F. Thus contacting surface 28F, extending between side walls 18F and 20F, includes end surface 33F of lip portion 32F, recessed portion 38F with walls 34F, 36F and contacting region 40F.

The construction of second tape element 14 is similar and is shown in FIGS. 3 and 4 using the same reference numerals as for first tape element 12, but substituting the suffix "S" for the suffix "F". For the avoidance of doubt, suffix "F" is used in respect of the first tape element 12 and suffix "S" is used in respect of the second tape element 14.

It is noted that tape elements 12, 14 may be identical, but this is not an essential requirement.

Contacting region 40F of first tape element 12 includes at least one surface 42F. Contacting region 40S of second tape element 14 includes at least one surface 42S. When the first and second tape elements 12, 14 form tape 10, the respective surface or surfaces 42F, 42S are in contact. In preferred constructions, the contacting regions 40F and 40S are shaped to define cooperating formations 44F, 44S. Thus, contacting region 40F includes a plurality of protruding formations 44F which project outwardly away from base wall 16F. The protruding formations 44F are bounded by surfaces 42F and define between them troughs or valleys. Contacting region 40S of second tape element 14 includes a plurality of protruding formations 44S which project outwardly from base wall 16S. The protruding formations 44S are bounded by surfaces 42S and define between them troughs or valleys. When the tape elements 12, 14 are united to form tape element 10, the protruding formations 44F of the first tape element are received in the corresponding valleys of the second tape element 14 and the protruding formations 44S of the second tape element 14 are received in the corresponding valleys of the first tape element 12. In the embodiment illustrated in FIGS. 3 and 4 the formations 44F, 44S present an approximately saw-tooth like profile, but such a profile is not essential. For example, a single projection on one of the tape elements 12, 14 may be received in a single corresponding valley of the other of the tape elements 14, 12. In other constructions, the cooperating formations may present a series of interlocking curves. The cooperating formations such as formations 44F, 44S, serve to resist relative displacement of the tape elements 12, 14 in a give direction. In the construction illustrated in FIGS. 3 and 4, and as will normally be the case, the given direction is a lateral direction approximately parallel to centre line C as generally indicated by arrows "A".

Referring now in particular to FIG. 4, the interlocking of adjacent windings of tape 10 comprising first and second tape elements, as illustrated in FIG. 3, is shown by means of a cross section through two adjacent windings. Components of the tape 10 are indicated with the same reference numerals as in FIG. 3, but with the added subscript 1 for the first winding and 2 for the second winding. Although the terms "first winding" and "second winding" are used here for convenience, it will be understood that the tape is continuous and unbroken and that both "windings" are part of the same continuous tape. It will be appreciated that the tape layer may be formed by wrapping one, two or more tapes from respective reels around the underlying layer.

As can be seen in FIG. 4, first winding $10_1$ is located adjacent to second winding $10_2$. Lip portion $32F_2$ of second winding $10_2$ is received in recessed portion $38S_1$ of first winding $10_1$. Preferably end portion $33F_2$ of lip portion $32F_2$ includes a planar end face which contacts recessed floor surface $39S_1$ of recessed portion $38S_1$, which floor surface is preferably substantially planar. Similarly, lip portion $32S_1$ of first winding $10_1$ is received in recessed portion $38F_2$ of second winding $10_2$. Preferably end portion $33S_1$ of lip portion $32S_1$ includes a planar end face which contacts recessed floor surface $39F_2$ of recessed portion $38F_2$, which floor surface is preferably substantially planar. Thus, end surface $33F_2$ can move along floor surface $39S_1$ and likewise end surface $33S_1$ can move along floor surface $39F_2$. In other words, movement of winding $10_1$ with respect to winding $10_2$ is allowed in the directions indicated generally by arrow "B". Such movement is advantageous in order to accommodate bending and stretching (when in tension) of the pipe body about which the tape 10 is wound. By moving in the direction indicated by arrow "B" the tape windings $10_1$ and $10_2$ can adopt any position between an extended configuration where walls $34S_1$ and $34F_2$ are in contact and a contracted configuration where wall $20F_2$ contacts wall $18F_1$ and wall $36S_1$ and in which wall $20S_1$ contacts wall $18S_2$ and wall $36F_2$. Thus walls $34S_1$ and $36S_1/18F_1$ act as stop walls limiting the movement of tape lip portion $32F_2$ with respect to tape winding $10_1$ and walls $34F_2$ and $36F_2/18S_2$ act as stop walls limiting the movement of tape lip portion $32S_1$.

Figure 5:
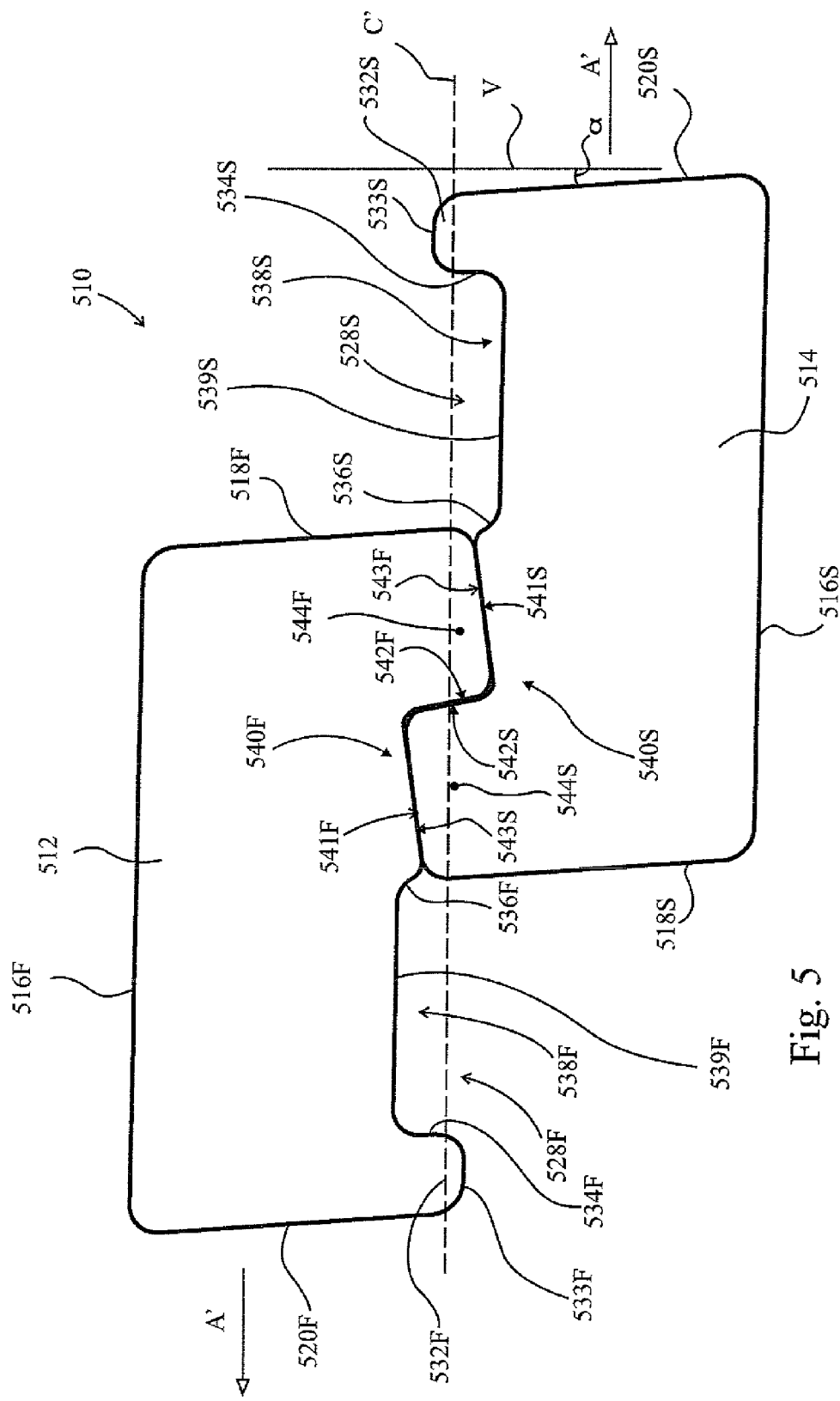
FIG. 5 illustrates the cross section/profile of a pressure armour tape according to a second embodiment.
Figure 6:
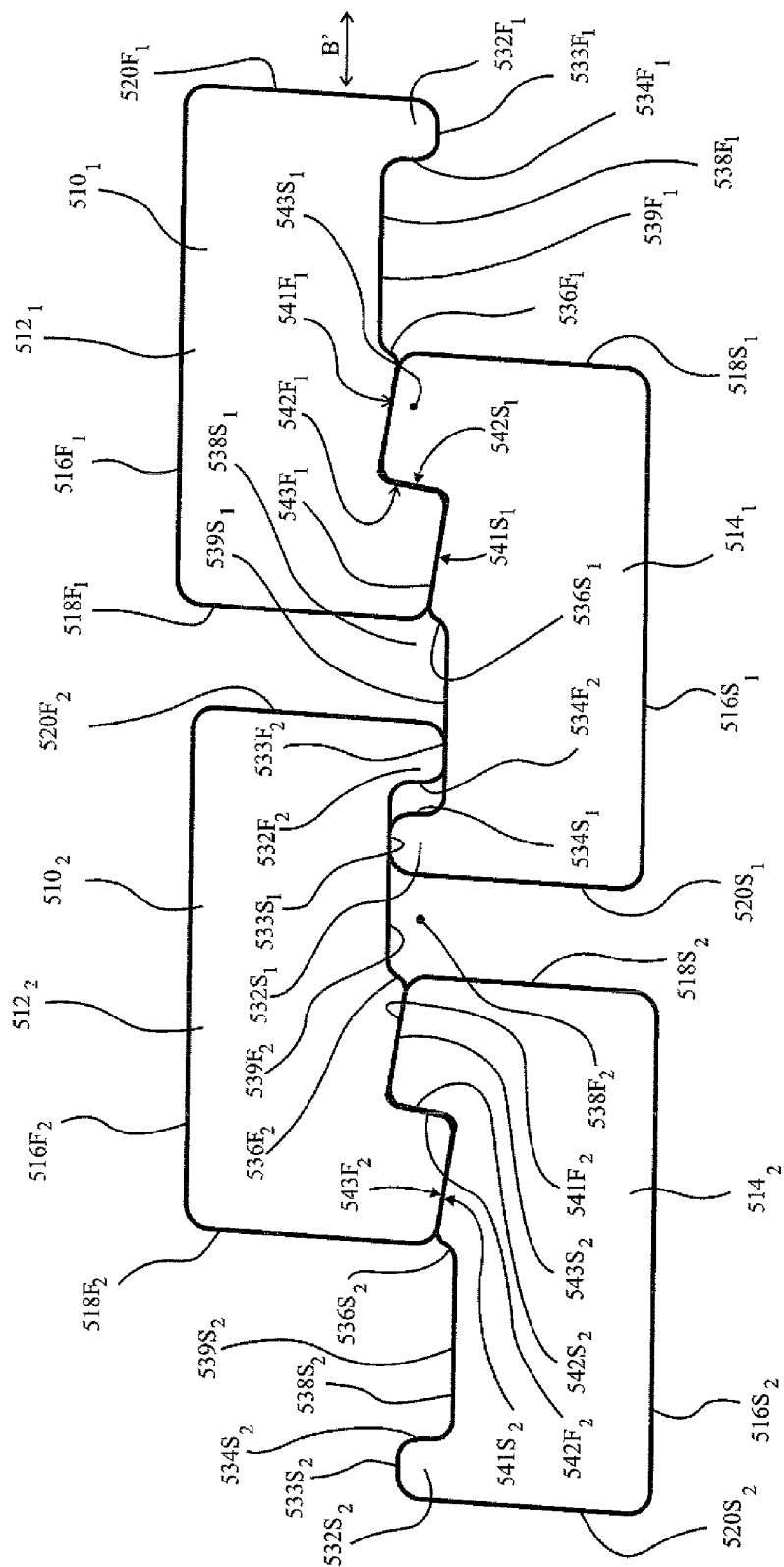
FIG. 6 illustrates a pressure armour layer of interlocked windings according to the second embodiment.

Referring now to FIGS. 5 and 6, an alternative embodiment of the tape 510 according to the disclosure is illustrated. In FIGS. 5 and 6 the tape 510 comprises a first tape element 512 and second tape element 514. The construction of second tape element 514 is similar to that of the first tape element 512 and is shown in FIGS. 5 and 6 using the same reference numerals as for first tape element 512, but substituting the suffix "S" for the suffix "F". For the avoidance of doubt, suffix "F" is used in respect of the first tape element 512 and suffix "S" is used in respect of the second tape element 514.

First tape element 512 comprises a base wall 516F and side walls 518F, 520F extending from the base wall 516F. In the embodiment of FIGS. 5 and 6, side walls 518F, 520F are inclined with respect to a perpendicular of the base wall 516F. Similarly, second tape element 514 comprises a base wall 516S and side walls 518S, 520S extending from the base wall 516S. In the embodiment of FIGS. 5 and 6, side walls 518S, 520S are inclined with respect to a perpendicular of the base wall 516S. That is, walls 518F, 520F and 518S, 520S are inclined with respect to nominally vertical line "V" shown in FIG. 5. Of course, line "V" is vertical only in the context of the cross sectional illustration in FIG. 5 and does not represent the in-use orientation of the tape. Preferably the wall 520S is inclined with respect to nominally vertical line "V" by an angle α of less than about 15°, preferably about 6° to 12°. The angle of inclination of wall 518S is the same as that of wall 520S. The angles of inclination of walls 518F and 520F are also in the range of less than about 15°, preferably about 6° to 12°. The angles of inclination of walls 518F and 520F are the same, but are not necessarily the same as the angle of inclination of walls 518S, 520S.

First and second tape elements include respective contacting surfaces $528F$, $528S$. Contacting surface $528F$ of first tape element $512$ extends from side wall $518F$ to side wall $520F$ and forms the external face of the tape element $512$ opposite base wall $516F$. Similarly contacting surface $528S$ of second tape element $514$ extends from side wall $518S$ to side wall $520S$ and forms the external face of the second tape element $514$ opposite base wall $516S$.

First tape element $512$ includes a lip portion $532F$ extending away from base wall $516F$. Lip portion $532F$ is bounded on a first side by side wall $520F$ and on an opposed second side by a wall $534F$. In preferred constructions, lip portion $532F$ may extend across an imaginary lateral centre line C' of the tape $510$. In some preferred constructions, lip portion $532F$ may be provided with a distal (with respect to the base surface $516F$) end surface $533F$ which is substantially planar. In other constructions, the distal end surface of lip portion $532F$ may be curved. A recessed portion $538F$ is provided adjacent lip portion $532F$ and is bounded by walls $534F$ and $536F$. Recessed portion $538F$ includes a recessed floor surface $539F$. In embodiments walls $534F$ and $536F$ may merge smoothly into floor surface $539F$ without any distinguishable boundary. For example, walls $534F$ and $536F$ and floor surface $539F$ may be parts of a continuous curved surface. Preferably, however, at least part (and in particular the major part and especially substantially all) of floor surface $539F$ is planar.

A contacting region $540F$ extends between wall $536F$ of recessed portion $538F$ and side wall $518F$. Thus contacting surface $528F$, extending between side walls $518F$ and $520F$, includes end surface $533F$ of lip portion $532F$, recessed portion $538F$ with walls $534F$, $536F$ and contacting region $540F$.

The construction of second tape element $514$ is similar. It is noted that tape elements $512$, $514$ may be identical, but this is not an essential requirement.

Contacting region $540F$ of first tape element $12$ includes surfaces $541F$, $542F$ and $543F$. Contacting region $540S$ of second tape element $514$ includes surfaces $541S$, $542S$ and $543S$. Side wall $518F$ together with surfaces $543F$ and $542F$ define a longitudinally extending tooth $544F$ of first tape element $512$ which, when the tape elements $512$, $514$ are united in use is received in a tooth receiving region bounded by walls $542S$ and $541S$ of the second tape element $514$. Similarly side wall $518S$ together with surfaces $543S$ and $542S$ define a longitudinally extending tooth $544S$ of second tape element $514$ which, when the tape elements $512$, $514$ are united in use is received in a tooth receiving region bounded by walls $542F$ and $541F$ of the first tape element $512$. Thus, when the first and second tape elements $512$, $514$ form tape $510$, respective surfaces $541F$ and $543S$, $542F$ and $542S$, and $543F$ and $541S$ are in contact. The longitudinally extending teeth $544F$, $544S$ form cooperating formations which serve to resist relative displacement of the tape elements $512$, $514$ in a given direction. In the construction illustrated in FIGS. 5 and 6, and as will normally be the case, the given direction is a lateral direction approximately parallel to centre line C' as generally indicated by arrows "A'". The formations formed, for example, by the teeth resist movement in at least one direction and transmit and share the load in the tape. This helps particularly to share the pressure loads exerted radially in the pipe. Also stresses exerted on the tape are also shared.

Referring now in particular to FIG. 6, the interlocking of adjacent windings of tape $510$ comprising first and second tape elements $512$, $514$, as illustrated in FIG. 5, is shown by means of a cross section through two adjacent windings. Components of the tape $510$ are indicated with the same reference numerals as in FIG. 5, but with the added subscript $1$ for the first winding and $2$ for the second winding. Although the terms "first winding" and "second winding" are used here for convenience, it will be understood that the tape is continuous and unbroken and that both "windings" are part of the same continuous tape.

As can be seen in FIG. 6, first winding $510_1$ is located adjacent to second winding $510_2$. Lip portion $532F_2$ of second winding $510_2$ is received in recessed portion $538S_1$ of first winding $510_1$. Preferably end portion $533F_2$ of lip portion $532F_2$ includes a planar end face which contacts recessed floor surface $539S_1$ of recessed portion $538S_1$, which floor surface is preferably substantially planar. Similarly, lip portion $532S_1$ of first winding $510_1$ is received in recessed portion $538F_2$ of second winding $510_2$. Preferably end portion $533S_1$ of lip portion $532S_1$ includes a planar end face which contacts recessed floor surface $539F_2$ of recessed portion $538F_2$, which floor surface is preferably substantially planar. Thus, end surface $533F_2$ can move along floor surface $539S_1$ and likewise end surface $533S_1$ can move along floor surface $539F_2$. In other words, movement of winding $510_1$ with respect to winding $510_2$ is allowed in the directions indicated generally by arrow "B'". Such movement is advantageous in order to accommodate bending and stretching (when in tension) of the pipe body about which the tape $510$ is wound. By moving in the direction indicated by arrow "B'" the tape windings $510_1$ and $510_2$ can adopt any position between an extended configuration where walls $534S_1$ and $534F_2$ are in contact and a contracted configuration where wall $520F_2$ contacts wall $518F_1$ and wall $536S_1$ and in which wall $520S_1$ contacts wall $518S_2$ and wall $536F_2$. Thus walls $534S_1$ and $536S_1/518F_1$ act as stop walls limiting the movement of tape lip portion $532F_2$ with respect to tape winding $510_1$ and walls $534F_2$ and $536F_2/518S_2$ act as stop walls limiting the movement of tape lip portion $532S_1$.

By constructing the tape according to the invention from paired tape elements, advantages accrue in the manufacturing of the tape. Because the thickness of the tape element (i.e. the distance between wall $16S$ and surface $33S$ of tape element $14$ or between wall $16F$ and surface $33F$ of tape element $12$ in FIG. 3) is less than that of the tape as a whole (i.e. the distance between walls $16F$ and $16S$ in FIG. 3), forming of the tape element in manufacture is easier. Thus, a tape formed from paired tape elements can be thicker overall than a conventional tape element leading to a significant increase in pressure retaining capacity. Furthermore, application of the tape to a pipe is easier because the tape elements are relatively more easily deformed to adopt the required helical shape, so that forming loads on application of the tape are reduced. One desirable material for forming tapes is carbon steel which has been work hardened to produce higher tensile strength. However, production of tape out of such steel becomes more difficult as the section (thickness) increases and the production of consistent through section strength is also more difficult. Preparing a tape from paired tape elements obviates or at least ameliorates this problem because the tape elements are relatively thinner.

The interface between the tape elements formed by the contacting regions may be assembled dry or with lubrication. In some circumstances, an adhesive may be used to bond the tape elements together. The use of an adhesive can facilitate the application of the tape of the invention to smooth bore product.

In other variations, relative tension may be introduced in the outer of the tape elements during application of the tape. Such tension will have the effect of producing compression in the inner of the tape elements which increases the pressure withstanding capability of the tape layer.

In further variations a gap may be provided at the interface between the tape elements formed by the contacting regions which is configured to accommodate sensor wires, fibres or the like in order to allow in-service monitoring of strain, temperature, compressive or axial load at the interface.

In another variation, the joint formed by the cooperating formations at the interface between the tape elements formed by the contacting regions may be configured so that slippage between the tape elements when the pipe is under excessive tension occurs before slippage of a lip portion 32 from a recess 38. In this case, provision of sensing means at the interface provides an early warning of loss of interlock between adjacent windings of the tape. For example, the sensing means could be a wire, optical fibre or the like which is broken on relative movement of the tape elements at the interface.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An elongate metallic or polymeric or composite tape for forming at least one helically wound layer of interlocked windings in a flexible pipe body for transporting production fluids, the tape having a substantially Zeta-shaped profile and being configured for interlocking of adjacent windings in the layer of tape by nesting of a hooked region of a winding in a valley region of an adjacent winding, wherein the tape comprises a first and a second elongate tape element arranged in contacting relation, thereby providing the Zeta-shaped profile, wherein the first and second elongate tape elements each comprise cooperating formations and wherein the cooperating formations on each of the first and second tape elements comprise complementary profiles such that cooperating formations on each winding of the first tape element are shaped to engage with respective cooperating formations of an adjacent winding of the second tape element and wherein engagement of the cooperating formations is operable to resist relative displacement of the first and second elongate tape elements in a given direction, wherein the first tape element defines said hooked region and includes a first contacting surface having a first contacting region and the second tape element defines said valley region and includes a second contacting surface having a second contacting region, and wherein the contacting regions of the respective contacting surfaces being in contacting relation;

wherein the first tape element has an outer peripheral surface defined by a base wall, opposed side walls extending from the base wall and the first contacting surface extending between the respective side walls opposite the base wall, and the second tape element has an outer peripheral surface defined by a base wall, opposed side walls extending from the base wall and the second contacting surface extending between the respective side walls opposite the base wall; and wherein the contacting surface of the first tape element comprises the first contacting region, a lip portion adjacent one of said side walls and a recessed portion, having a recessed floor surface, defined between the lip portion and the first contacting region, the lip portion and the recessed portion defining said hooked region, and the contacting surface of the second tape element comprises the second contacting region, a lip portion adjacent one of said side walls and a recessed portion, having a recessed floor surface, between the lip portion and the second contacting region, the lip portion and the recessed portion defining said valley region.

2. An elongate tape as claimed in claim 1 wherein the cooperating formations of the first and second tape elements are formed in, on or by all or part of the respective contacting regions of the first and second tape elements.

3. An elongate tape as claimed in claim 2 wherein the contacting region of one of the first and second tape elements includes a longitudinally extending trough or valley and the contacting region of the other of the first and second elements includes a longitudinally extending protruding formation of complementary shape to said trough or valley and which is received in said trough or valley.

4. An elongate tape as claimed in claim 2 wherein the contacting regions of the first and second tape elements include at least one longitudinally extending trough or valley and at least one longitudinally extending protruding formation, the or each protruding formation of the first tape element being received in a valley of complementary shape of the second tape element and the or each protruding formation of the second tape element being received in a valley of complementary shape of the first tape element.

5. An elongate tape as claimed in claim 2 wherein the contacting regions of the first and second tape elements comprise a longitudinally extending tooth having a top surface extending from one side wall of the respective first or second tape element, a side surface extending from the top surface towards the base wall, and a tooth receiving region comprising a base surface extending from said side surface towards the other side wall of the respective first or second tape element, the side surface of the tooth of the first tape element being in contacting relation with the side surface of the tooth of the second tape element and the tooth top surface of each tape element being in contacting relation with the base surface of the tooth receiving region of the other tape element.

6. An elongate tape as claimed in claim 1 wherein the recessed portion of the second tape element comprises opposed stop walls at opposed sides of the recessed floor surface wherein, when in said helically wound layer, the lip portion of a first tape element is received in a recessed portion of the second tape element of an adjacent winding and may move along said recessed floor surface between said stop walls.

7. An elongate tape as claimed in claim 6 wherein one of said stop walls is defined by a wall of the respective lip portion.

8. An elongate tape as claimed in claim 1 wherein the recessed portion of the first tape element comprises opposed stop walls at opposed sides of the recessed floor surface wherein, when in said helically wound layer, the lip portion of a second tape element is received in a recessed portion of the first tape element of an adjacent winding and may move along said recessed floor surface between said stop walls.

9. An elongate tape as claimed in claim 1 wherein the cooperating formations of the first and second tape elements are formed in, on or by all or part of the respective contacting regions of the first and second tape elements.

10. An elongate tape as claimed in claim 1 wherein the recessed floor surface of each contacting surface is a planar surface and is arranged substantially parallel to an imaginary laterally extending centre line of the tape.

11. An elongate tape as claimed in claim 10 wherein the lip portion of the first tape element rests in use in contacting relation with the planar surface of the recessed region of a second tape element.

12. An elongate tape as claimed in claim 10 wherein the lip portion of the second tape element rests in use in contacting relation with the planar surface of the recessed region of a first tape element.

13. An elongate tape as claimed in claim 1 wherein the lip portion of the first tape element includes an end surface distal from the base wall, which end surface includes a substantially planar portion.

14. An elongate tape as claimed in claim 1 wherein the lip portion of the second tape element includes an end surface distal from the base wall, which end surface includes a substantially planar portion.

15. An elongate tape as claimed in claim 1 wherein the first and second tape elements are substantially identical.

16. An elongate tape as claimed in claim 1, wherein:
said layer has a radially inner and outer surfaces defined by windings of the tape said inner surface being substantially planar and defined by a base surface of said second tape element and said outer surface being substantially planar and defined by a base surface of said first tape element.

17. An elongate tape as claimed in claim 1 wherein the lip portions of the respective tape elements extend beyond an imaginary laterally extending centre line of the layer.

18. An elongate tape as claimed in claim 1 further comprising at least one groove in a radially outer surface of each winding.

19. A flexible pipe body for transporting production fluids, comprising: at least one helically wound layer of the tape as claimed in claim 1, adjacent windings in the layer of tape being interlocked by a hooked region of a winding nested in a valley region of an adjacent winding.

20. A flexible pipe comprising the flexible pipe body as claimed in claim 19 and further comprising at least one end fitting.

21. A riser, flowline or jumper comprising the flexible pipe as claimed in claim 20.

22. A flexible pipe body as claimed in claim 1, further comprising an internal pressure sheath, wherein said at least one tape layer comprises a pressure armour layer over the internal pressure sheath.

23. A flexible pipe body as claimed in claim 22 wherein said internal pressure sheath comprises a barrier layer or liner.

24. An elongate tape as claimed in claim 1, wherein the first tape element comprises:
a base wall, opposed side walls extending from the base wall and a contacting surface extending between the side walls opposite the base wall, wherein the contacting surface comprises;
a contacting region configured for mounting in contacting relation with a contacting region of the second tape element,
a lip portion, and
a recessed portion defined between the lip portion and the contacting region.

25. An elongate tape as claimed in claim 24 wherein the cooperating formation of the first tape element is formed in, on or by all or part of the contacting region of the first tape element.

26. A method of manufacturing flexible pipe body, comprising the steps of:
helically winding one or more tapes of the type as claimed in claim 1 around a substantially tubular under-layer.

27. The method as claimed in claim 26 wherein the tubular under layer comprises an internal pressure sheath.

28. An elongate metallic or polymeric or composite tape for forming at least one helically wound layer of interlocked windings in a flexible pipe body for transporting production fluids, wherein the tape comprises first and second elongate tape elements arranged in contacting relation, thereby providing a Zeta-shaped profile, each tape element having;
cooperating formations and wherein the cooperating formations on each of the first and second tape elements comprise complementary profiles such that cooperating formations on each winding of the first tape element are shaped to engage with respective cooperating formations of an adjacent winding of the second tape element and wherein engagement of the cooperating formations is operable to resist relative displacement of the first and second elongate tape elements in a given direction;
a lip portion at a marginal edge thereof, the lip portion extending towards an imaginary lateral centre line of the tape, and
a recessed portion adjacent comprising a recessed floor surface and opposed stop walls
wherein, when in said helically wound layer, the lip portion of the first or second tape element is received in a recessed portion of the respective second or first tape element of an adjacent winding and may move along said recessed floor surface between said stop walls.

29. An elongate tape as claimed in claim 28 wherein one of said stop walls is defined by a wall of the respective lip portion.

30. An elongate tape as claimed in claim 28 wherein the first tape element comprises a first contacting surface including a first contacting region and the second tape element includes a second contacting surface including a second contacting region, the first and second contacting regions being in confronting relation.

31. An elongate tape as claimed in claim 30 wherein
the first tape element has an outer peripheral surface defined by a base wall, opposed side walls extending from the base wall and the first contacting surface extending between the respective side walls opposite the base wall and
the second tape element has an outer peripheral surface defined by a base wall, opposed side walls extending from the base wall and the second contacting surface extending between the respective side walls opposite the base wall.

32. An elongate tape as claimed in claim 31 wherein the first contacting surface of the first tape element comprises the first contacting region, the lip portion and the recessed portion, wherein the recessed portion is defined between the lip portion and the first contacting region.

33. An elongate tape as claimed in claim 31 wherein the second contacting surface of the second tape element comprises the second contacting region, the lip portion and the recessed portion, wherein the recessed portion is defined between the lip portion and the first contacting region.

34. An elongate tape as claimed in claim 28 wherein the cooperating formations of the first and second tape elements are formed in, on or by all or part of the respective contacting regions of the first and second tape elements.

35. A method comprising:
    transporting production fluids through a flexible pipe;
    the flexible pipe comprising:
        a flexible pipe comprising at least one helically wound layer of an elongate metallic or polymeric or composite tape; and
        at least one end fitting;
        the tape having a substantially Zeta-shaped profile, wherein adjacent windings of the tape are interlocked by a hooked region of a winding in a valley region of an adjacent winding, wherein the tape comprises a first and a second elongate tape element arranged in contacting relation, thereby providing the Zeta-shaped profile, wherein the first and second elongate tape elements each comprise cooperating formations and wherein the cooperating formations on each of the first and second tape elements comprise complementary profiles such that cooperating formations on each winding of the first tape element engage with respective cooperating formations of an adjacent winding of the second tape element and wherein engagement of the cooperating formations resists relative displacement of the first and second elongate tape elements in a given direction.

36. An elongate metallic or polymeric or composite tape for forming at least one helically wound layer of interlocked windings in a flexible pipe body for transporting production fluids, the tape having a substantially Zeta-shaped profile and being configured for interlocking of adjacent windings in the layer of tape by nesting of a hooked region of a winding in a valley region of an adjacent winding, wherein the tape comprises a first and a second elongate tape element arranged in contacting relation, thereby providing the Zeta-shaped profile, wherein the first and second elongate tape elements each comprise cooperating formations and wherein the cooperating formations on each of the first and second tape elements comprise complementary profiles such that cooperating formations on each winding of the first tape element are shaped to engage with respective cooperating formations of an adjacent winding of the second tape element and wherein engagement of the cooperating formations is operable to resist relative displacement of the first and second elongate tape elements in a given direction;
    wherein the first tape element comprises:
    a base wall, opposed side walls extending from the base wall and a contacting surface extending between the side walls opposite the base wall, wherein the contacting surface comprises:
    a contacting region configured for mounting in contacting relation with a contacting region of the second tape element,
    a lip portion, and
    a recessed portion defined between the lip portion and the contacting region,
    wherein the recessed portion includes a planar recessed floor surface.

37. An elongate tape as claimed in claim 36 wherein the planar surface is arranged substantially parallel to the base wall.

38. An elongate metallic or polymeric or composite tape for forming at least one helically wound layer of interlocked windings in a flexible pipe body for transporting production fluids, the tape having a substantially Zeta-shaped profile and being configured for interlocking of adjacent windings in the layer of tape by nesting of a hooked region of a winding in a valley region of an adjacent winding, wherein the tape comprises a first and a second elongate tape element arranged in contacting relation, thereby providing the Zeta-shaped profile, wherein the first and second elongate tape elements each comprise cooperating formations and wherein the cooperating formations on each of the first and second tape elements comprise complementary profiles such that cooperating formations on each winding of the first tape element are shaped to engage with respective cooperating formations of an adjacent winding of the second tape element and wherein engagement of the cooperating formations is operable to resist relative displacement of the first and second elongate tape elements in a given direction;
    wherein the first tape element comprises:
    a base wall, opposed side walls extending from the base wall and a contacting surface extending between the side walls opposite the base wall, wherein the contacting surface comprises:
    a contacting region configured for mounting in contacting relation with a contacting region of the second tape element,
    a lip portion, and
    a recessed portion defined between the lip portion and the contacting region,
    wherein the lip portion includes an end surface distal from the recessed region, the end surface including a substantially planar portion.

39. A method of manufacturing a flexible pipe body, comprising the steps of:
    helically winding one or more tapes around a substantially tubular under-layer; and
    the step or steps of forming one or more layers over the helically wound tape;
    wherein the one or more tapes each have a substantially Zeta-shaped profile, wherein adjacent windings of each tape are interlocked by a hooked region of a winding in a valley region of an adjacent winding, wherein each tape comprises a first and a second elongate tape element arranged in contacting relation, thereby providing the Zeta-shaped profile, wherein the first and second elongate tape elements each comprise cooperating formations and wherein the cooperating formations on each of the first and second tape elements comprise complementary profiles such that cooperating formations on each winding of the first tape element engage with respective cooperating formations of an adjacent winding of the second tape element and wherein engagement of the cooperating formations resists relative displacement of the first and second elongate tape elements in a given direction.

* * * * *